(12) United States Patent
Kang et al.

(10) Patent No.: US 12,309,347 B2
(45) Date of Patent: May 20, 2025

(54) IMAGE ACQUISITION APPARATUS

(71) Applicant: Vieworks Co., Ltd., Anyang-si (KR)

(72) Inventors: Yu Jung Kang, Anyang-si (KR); Hooshik Kim, Seongnam-si (KR)

(73) Assignee: Vieworks Co., Ltd., Anyang-si (KR)

( * ) Notice: Subject to any disclaimer, the term of this patent is extended or adjusted under 35 U.S.C. 154(b) by 177 days.

(21) Appl. No.: 18/348,485

(22) Filed: Jul. 7, 2023

(65) Prior Publication Data

US 2023/0353721 A1 Nov. 2, 2023

Related U.S. Application Data

(63) Continuation of application No. PCT/KR2022/000028, filed on Jan. 3, 2022.

(30) Foreign Application Priority Data

Jan. 21, 2021 (KR) .................. 10-2021-0008628

(51) Int. Cl.
*H04N 13/243* (2018.01)
*G02B 21/22* (2006.01)
*G02B 21/26* (2006.01)
*G02B 21/36* (2006.01)
*G02B 27/12* (2006.01)
*G02B 27/28* (2006.01)

(52) U.S. Cl.
CPC ........... *H04N 13/243* (2018.05); *G02B 21/22* (2013.01); *G02B 21/26* (2013.01); *G02B 21/361* (2013.01); *G02B 27/126* (2013.01); *G02B 27/283* (2013.01)

(58) Field of Classification Search
CPC ...... H04N 13/243; G02B 21/22; G02B 21/26; G02B 21/361
See application file for complete search history.

(56) References Cited

U.S. PATENT DOCUMENTS

| 8,184,920 B2 | 5/2012 | Oshiro et al. |
| 8,416,491 B2 | 4/2013 | Chen et al. |
| 2007/0153273 A1 | 7/2007 | Meeks et al. |
| 2007/0182844 A1 | 8/2007 | Allman et al. |
| 2015/0229910 A1 | 8/2015 | Lang et al. |

(Continued)

FOREIGN PATENT DOCUMENTS

| JP | 2000241757 A | 9/2000 |
| JP | 2005214966 A | 8/2005 |

(Continued)

*Primary Examiner* — On S Mung
(74) *Attorney, Agent, or Firm* — Bridgeway IP Law Group, PLLC; Jihun Kim (57) ABSTRACT

Provided is an image acquisition apparatus capable of acquiring a clear and high-resolution stereo image by increasing the depth of field for a thick subject or a subject with inconsistent thickness. An image acquisition apparatus according to an exemplary embodiment of the present invention includes: a polarizing prism unit for splitting an incident light beam; and a plurality of image collecting units for collecting the split light beam from the polarizing prism unit, in which the polarizing prism unit includes: a first polarization unit having a first polarization angle obtained by adding half a binocular parallax angle of a person to 45°, and a second polarization unit disposed to be in contact with the first polarization unit and having a second polarization angle obtained by subtracting half of the binocular parallax angle of a person from 45°.

18 Claims, 7 Drawing Sheets

(56) References Cited

U.S. PATENT DOCUMENTS

| | | |
|---|---|---|
| 2016/0054576 A1 | 2/2016 | Inoue et al. |
| 2016/0161753 A1 | 6/2016 | Nishiwaki et al. |
| 2017/0315370 A1 | 11/2017 | Kim et al. |

FOREIGN PATENT DOCUMENTS

| | | |
|---|---|---|
| JP | 2007528028 A | 10/2007 |
| JP | 2009258263 A | 11/2009 |
| JP | 2014202957 A | 10/2014 |
| JP | 2016110146 A | 6/2016 |
| JP | 2018084572 A | 5/2018 |
| KR | 20120130418 A | 12/2012 |
| KR | 101686918 B1 | 12/2016 |
| WO | 2020095671 A1 | 5/2020 |

FIG. 1

(a) VIEW FROM THE SIDE OF SIX-SIDED PRISM (b) VIEW FROM THE SIDE OF SEVEN-SIDED PRISM

IMAGE ACQUISITION APPARATUS

TECHNICAL FIELD

The present invention relates to an image acquisition apparatus, and more particularly, to an image acquisition apparatus capable of acquiring a clear and high-resolution stereo image.

BACKGROUND ART

A microscope is an instrument that magnifies microscopic objects or microorganisms that are difficult to see with the human eye.

A slide scanner, which is used in conjunction with the microscope, refers to a device that automatically scans one or multiple slides to store and observe and analyze images, and the demand for the slide scanner is steadily increasing with the increase in demand for medical examinations.

The autofocus of the slide scanner in the related art suffers from inaccuracies in subjects that have inconsistent thickness or are thick with a thickness of 4 μm or more. Therefore, in the case of cytology, bone tissue examination, frozen tissue examination, and the like where the thickness of the subject is not consistent, it is difficult to examine the object by using a slide scanner, and diagnosis is still performed with the naked eye through a microscope.

To solve the problem, lenses with long focal lengths that can cover thick subjects at high magnification are required, but this is limited by the optical structure of the existing microscopes.

PRIOR ART LITERATURE

Patent Document (Patent 1) U.S. Pat. No. 8,184,920

DISCLOSURE

Technical Problem

An object of the present invention is to provide an image acquisition apparatus capable of acquiring a clear and high-resolution stereo image by increasing the depth of field for a thick subject or a subject with inconsistent thickness.

Another object of the present invention is to provide an image acquisition apparatus capable of accurately implementing a clear stereo image by considering the binocular parallax of a person.

Another object of the present invention is to provide an image acquisition apparatus for generating a two-dimensional image through stereo image matching.

Technical Solution

An image acquisition apparatus according to an exemplary embodiment of the present invention includes: a polarizing prism unit for splitting an incident light beam; and a plurality of image collecting units for collecting the split light beam from the polarizing prism unit.

Preferably, the polarizing prism unit includes: a first polarization unit having a first polarization angle obtained by adding half a binocular parallax angle of a person to 45°, and a second polarization unit disposed to be in contact with the first polarization unit and having a second polarization angle obtained by subtracting half of the binocular parallax angle of a person from 45°.

Preferably, the image collecting unit includes: a first image collecting unit for collecting a first light beam passed through the first polarization unit, and a second image collecting unit for collecting a second light beam refracted through the second polarization unit.

Preferably, the angle formed by the first image collecting unit and the second image collecting unit is a right angle.

An image acquisition apparatus according to another exemplary embodiment of the present invention includes: a polarizing prism unit for splitting an incident light beam; and a plurality of image collecting units for collecting the split light beam from the polarizing prism unit, in which an angle formed by each of the image collecting units is an angle obtained by adding a binocular parallax angle of a person to a right angle.

Preferably, the polarizing prism unit includes: a first polarization unit having a first polarization angle; and a second polarization unit disposed to be in contact with the first polarization unit and having a second polarization angle equal to the first polarization angle.

Preferably, the image collecting unit includes: a first image collecting unit for collecting a first light beam passed through the first polarization unit, and a second image collecting unit for collecting a second light beam refracted through the second polarization unit.

Preferably, the image acquisition apparatus further includes: an objective lens unit disposed under the polarizing prism unit; a stage disposed under the objective lens unit and provided with a slide unit; and a lighting unit disposed under the stage and emitting the light beam onto a subject disposed on the slide unit.

Preferably, the image acquisition apparatus further includes: a first focusing lens disposed between the first polarization unit and said first image collecting unit; and a second focusing lens disposed between the second polarization unit and the second image collecting unit.

Preferably, the image acquisition apparatus further includes: a condenser lens unit disposed under the polarizing prism unit; a stage disposed under the condenser lens unit and provided with a slide unit; and a lighting unit disposed under the stage and emitting the light beam onto a subject disposed on the slide unit.

Preferably, the image acquisition apparatus further includes a third focusing lens disposed between the polarizing prism unit and the condenser lens unit.

Preferably, the image acquisition apparatus further includes: an image processing unit for generating a two-dimensional image using a first image collected through the first image collecting unit and a second image collected through the second image collecting unit; and a display unit for outputting the two-dimensional image generated through the image processing unit.

Preferably, the polarizing prism unit is composed of a polyhedron.

Advantageous Effects

According to the present invention, it is possible to accurately implement the binocular parallax of a person in acquiring stereo images and acquire high-magnification images with a long focal length by making the first polarization unit and the second polarization unit provided in the polarizing prism unit have the first polarization angle and the second polarization angle, respectively, according to the binocular parallax angle of a person or configuring the angle formed by the plurality of image collecting units in consideration of the binocular parallax angle.

Further, it is possible to improve the depth of focus and acquire high-magnification two-dimensional images with a long focal length even for thick subjects or subjects with inconsistent thickness by configuring the polarizing prism unit according to the binocular parallax angle of a person, or by configuring the angle formed by a plurality of image collecting units according to the binocular parallax angle of a person.

In addition, it is possible to reduce the data capacity of the acquired image by matching the three-dimensional stereo image data into a two-dimensional image through the image processing unit and storing the matched image.

EXPLANATION OF REFERENCE NUMERALS AND SYMBOLS 100, 200, 300, 400: Image acquisition apparatus
10: Polarizing prism unit
20: Image collecting unit
30: Objective lens unit
40: Stage
50: Slide unit
60: Lighting unit
70: Image processing unit
80: Display unit

BEST MODE

Hereinafter, exemplary embodiments of the present invention will be described in detail with reference to the accompanying drawings. First of all, it should be noted that in giving reference numerals to elements of each drawing, like reference numerals refer to like elements even though like elements are illustrated in different drawings. Further, in the following description of the present invention, a detailed description of known configurations or functions incorporated herein will be omitted when it is judged that the detailed description may make the subject matter of the present invention unclear. It should be understood that although the exemplary embodiment of the present invention is described hereafter, the spirit of the present invention is not limited thereto and the present invention may be changed and modified in various ways by those skilled in the art.

Figure 1:
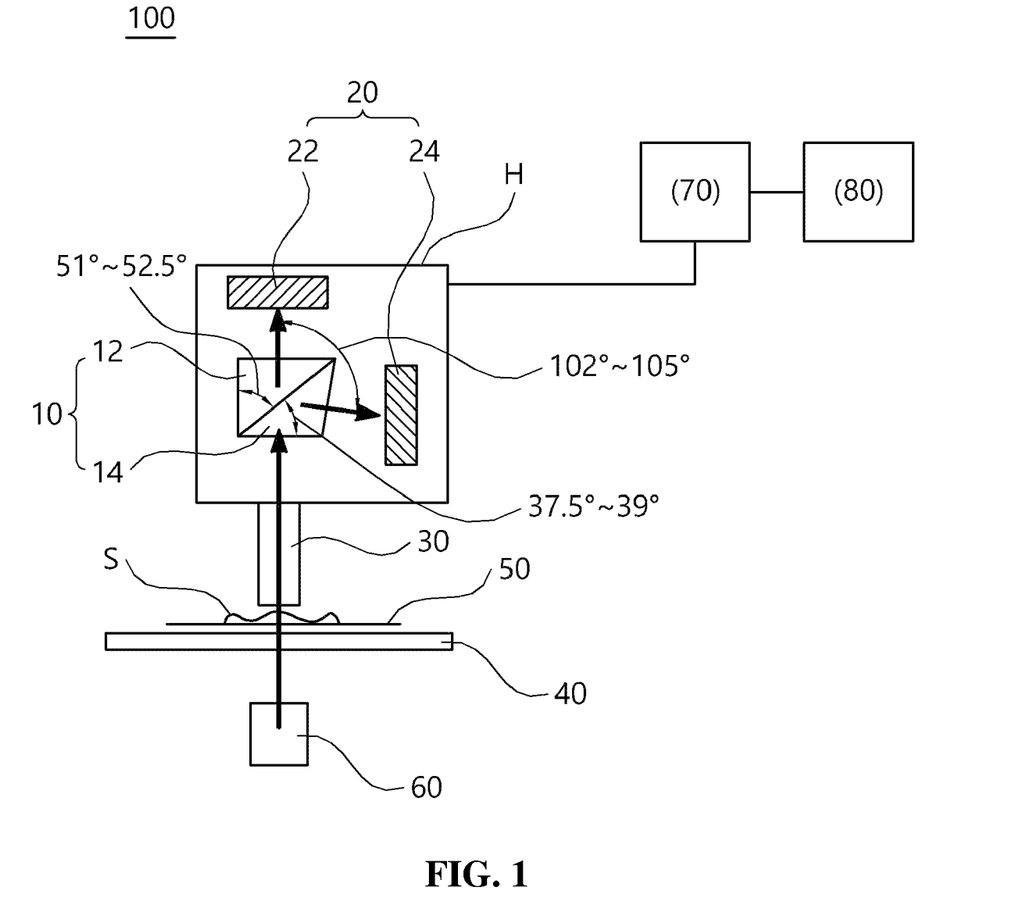
FIG. 1 is a diagram illustrating an image acquisition apparatus according to an exemplary embodiment of the present invention.
Figure 2:
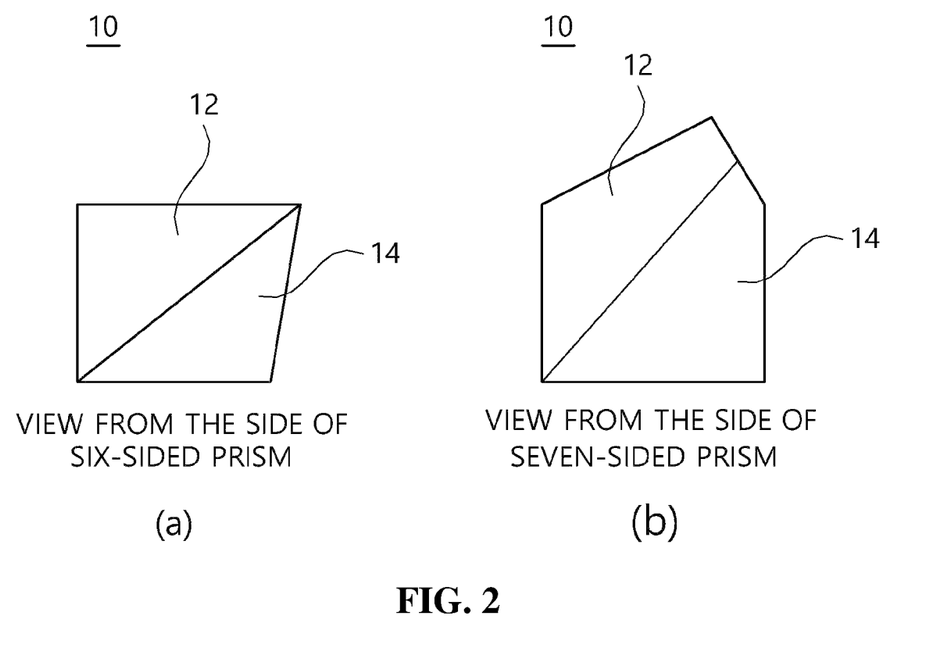
FIG. 2 is a diagram illustrating a polarizing prism unit provided in the image acquisition apparatus according to the exemplary embodiment of the present invention.

FIG. 1 is a diagram illustrating an image acquisition apparatus 100 according to an exemplary embodiment of the present invention, and FIG. 2 is a diagram illustrating a polarizing prism unit 10 provided in the image acquisition apparatus 100 according to the exemplary embodiment of the present invention. In this case, FIG. 2 may be a side view of the polarizing prism unit 10.

Referring to FIG. 1, the image acquisition apparatus 100 according to the exemplary embodiment of the present invention includes a polarizing prism unit 10 for splitting an incident light beam emitted from a lighting unit 60, which will be described below, and an image collecting unit 20 for collecting the split light beams from the polarizing prism unit 10.

In one example, the image acquisition apparatus 100 may be an optical microscope.

Preferably, the polarizing prism unit 10 and the image collecting unit 20 provided in the image acquisition apparatus 100 according to the exemplary embodiment of the present invention may be provided in a housing (body tube) H. In addition, the polarizing prism unit 10 may pass or refract the light beams emitted from the lighting unit 60.

The polarizing prism unit 10 is a type of beam splitter, and may include six sides as illustrated in part (a) of FIG. 2, or seven sides as illustrated in part (b) of FIG. 2. However, the shape of the polarizing prism unit 10 is not limited to this, and may also include a polyhedron other than a six- or seven-sided polyhedron.

In detail, as illustrated in FIGS. 1 and 2, the polarizing prism unit 10 includes a first polarization unit 12 and a second polarization unit 14 disposed to be in contact with the first polarization unit 12 with a diagonal plane (polarizing plane) 16 interposed therebetween.

The first polarization unit 12 may pass a portion of the incident light beams (a first light beam), and the second polarization unit 14 may refract a portion of the incident light beams (a second light beam).

Further, as illustrated in FIG. 1, a first polarization angle of the first polarization unit 12 may have an angle obtained by adding half of the binocular parallax angle of a person to 45°, and a second polarization angle of the second polarization unit 14 may have an angle obtained by subtracting half of the binocular parallax angle of the person from 45°.

In the exemplary embodiment of the present invention, binocular parallax refers to the parallax perceived by a person's left eye and right eye, which means that the left eye and right eye have slightly spatial difference and therefore observe slightly different images when looking at an object. Preferably, the gap (binocular distance) between the left eye and the right eye varies depending on the face shape of the person, but may be approximately 65 mm. Meanwhile, the binocular parallax angle of a person may be roughly 12° to 15°.

Preferably, the binocular parallax angle may vary depending on a distance of distinct vision and a binocular distance. In this case, the distance of distinct vision refers to the shortest distance at which a person can see an object clearly and continuously without experiencing eye fatigue, which may be approximately 250 mm, and may be determined according to the optical structure of the image acquisition apparatus 100.

As illustrated in FIG. 1, the angle (a first polarization angle) that the first polarization unit 12 makes with the vertical direction relative to a line segment on one side of a diagonal plane of the first polarization unit 12 may be 45° plus half (6° to 7.5°) of a binocular parallax angle of a person. Preferably, the first polarization angle may be approximately 51° to 52.5°.

Further, the angle (a second polarization angle) that the second polarization unit 14 makes with the horizontal direction relative to a line segment on one side of the diagonal plane of the second polarization unit 14 may be 45° minus half (6 to 7.5°) of the binocular parallax angle of a person. Preferably, the second polarization angle may be approximately 37.5° to 39°.

Referring to FIG. 1, the image collecting unit 20 includes a first image collecting unit 22 that collects the first light beam passing through the first polarization unit 12 and a second image collecting unit 24 that collects the second light beam refracted through the second polarization unit 14.

Preferably, the image collecting unit 20 may be formed of only an image sensor (not illustrated), or may also be provided with a focusing lens (not illustrated) and an image sensor (not illustrated). In this case, each of the first image collecting unit 22 and the second image collecting unit 24 may be equipped with two or more image sensors.

The image sensor converts optical signals into electrical signals to acquire image information, and may be an imaging device, such as a Charge Coupled Device (CCD) or a Complementary Metal Oxide Semiconductor (CMOS).

In this case, the angle formed by the first image collection unit 22 and the second image collection unit 24 may be a right angle as illustrated in FIG. 1.

Referring to FIG. 1, the image acquisition apparatus 100 according to the exemplary embodiment of the present invention further includes an objective lens unit 30 disposed under the polarizing prism unit 10, a stage 40 disposed under the objective lens unit 30 and provided with a slide unit 50, and the lighting unit 60 disposed under the stage 40 to emit a light beam onto a subject S disposed on the slide unit 50. In this case, the subject S may be disposed and fixed on the slide unit 50.

Preferably, in the image acquisition apparatus 100 according to the exemplary embodiment of the present invention, the lighting unit 60, the stage 40, the slide unit 50, the subject S, the objective lens unit 30, and the polarizing prism unit 10 may be arranged in order based on the optical axis of the light beam incident from the lighting unit 60. Furthermore, the objective lens unit 30 may be fixed to the housing H (body tube) described above, and the slide unit 50 disposed on the stage 40 may move in the X-axis, Y-axis, and Z-axis according to the operation of the stage 40.

When the magnification of the objective lens unit 30 is changed, the binocular parallax angle may change, and the first polarization angle and the second polarization angle described above may change accordingly.

Furthermore, the stage 40 is connected with a separate drive control means (not illustrated) to be capable of moving along with the slide unit 50 in the X-axis, Y-axis, and Z-axis according to a control signal of said drive control means.

Furthermore, the objective lens unit 30 is connected with a separate drive control means (not illustrated) to adjust the distance to the subject S or the stage 40 according to a control signal of the drive control means.

Figure 3:
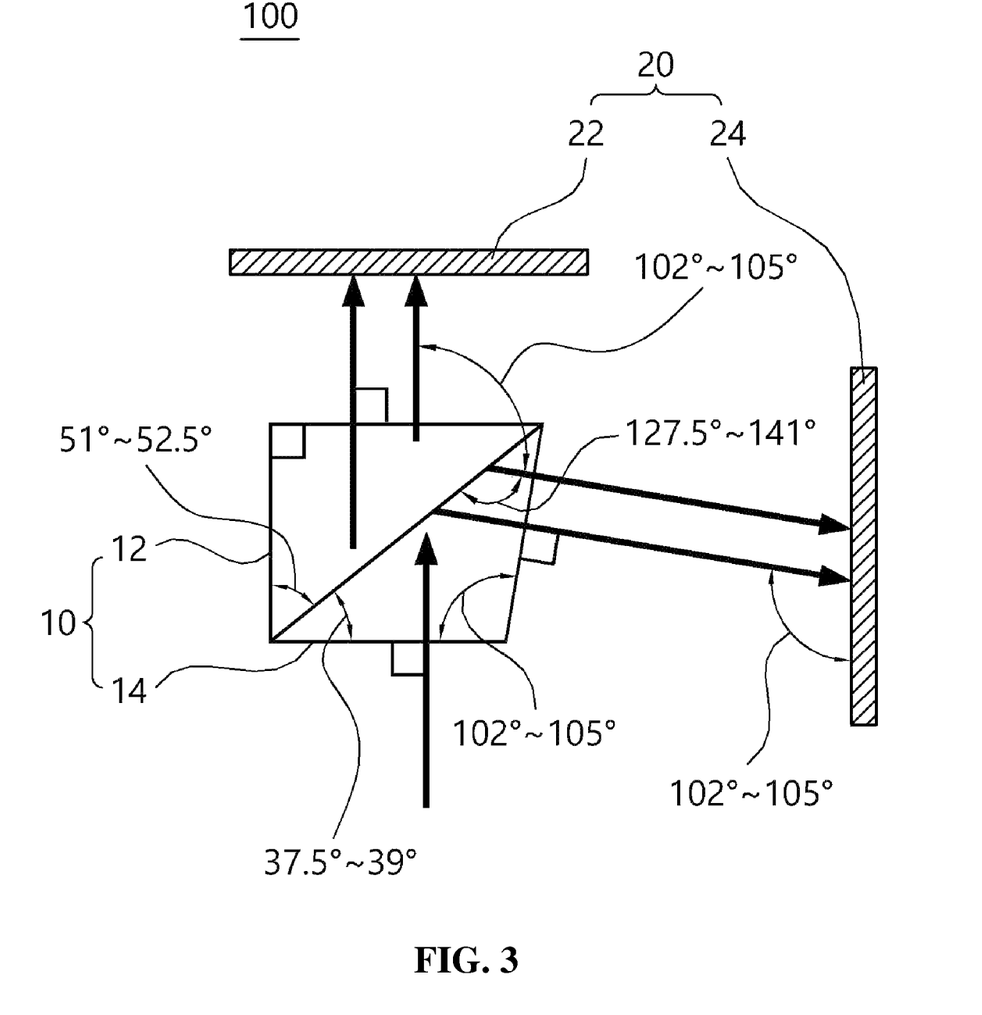
FIG. 3 is a diagram illustrating an optical path of an image acquisition apparatus according to the exemplary embodiment of the present invention.

FIG. 3 is a diagram illustrating an optical path of the image acquisition apparatus 100 according to the exemplary embodiment of the present invention. In this case, in FIG. 3, only the polarizing prism unit 10 and the image collecting unit 20 among the configurations of the image acquisition apparatus 100 will be illustrated, and the illustration of the remaining configurations will be omitted.

Referring to FIG. 3, light beams incident from the lighting unit 60 into the housing H may be split through the polarizing prism unit 10.

As described above, the first polarization unit 12 of the polarizing prism unit 10 may pass the first light beam, and the second polarization unit 14 may refract the second light beam. In this case, the travel distances of the first light beam passing through the first polarization unit 12 and the second light beam passing through the second polarization unit 14, separated at the same point on the polarizing plane (diagonal plane) 16, may be the same. In detail, the travel distance of the first light beam from the polarizing plane 16 before passing through the first polarization unit 12 and the travel distance of the second light beam from the polarizing plane 16 at the same point as the first light beam before passing through the second polarization unit 14 may be the same.

Preferably, the travel distances of the first light beam and the second light beam, which are separated at the same point on the polarizing plane 16, may be set to be the same regardless of whether the polarizing prism unit 10 is symmetrical or not.

As illustrated in FIG. 3, the first light beam that has passed through the first polarization unit 12 may be collected into the first image collecting unit 22, and the second light beam that has been refracted through the second polarization unit 14 may be collected into the second image collecting unit 24.

In this case, the angle formed by the first light beam passing through the first polarization unit 12 and the second light beam refracted through the second polarization unit 14 may be approximately 102° to 105°. Preferably, the angle formed by the first light beam and the second light beam in FIG. 3 may represent a right angle (90°) plus a binocular parallax angle of a person (12° to 15°).

For example, when the binocular parallax angle is 12°, the first polarization angle of the first polarization unit 12 may be 51° and the second polarization angle of the second polarization unit 14 may be 39°.

In this case, the angle formed by the first light beam passing through the first polarization unit 12 and the light beam refracted through the second polarization unit 14 may be 102° that is obtained by adding the binocular parallax angle of a person of 12° to the right angle 90°.

Thus, in the image acquisition apparatus 100 according to the exemplary embodiment of the present invention, it is possible to accurately implement the binocular parallax of a person in acquiring stereo images by making the first polarization unit 12 and the second polarization unit 14 provided in the polarizing prism unit 10 have the first polarization angle and the second polarization angle, respectively, according to the binocular parallax angle.

Further, in the image acquisition apparatus 100 according to the exemplary embodiment of the present invention, the polarizing prism unit 10 of a polyhedron having a six-sided or seven-sided shape is formed, and the first polarization unit 12 and the second polarization unit 14 provided in the polarizing prism unit 10 are made to have the first polarization angle and the second polarization angle, respectively, according to the binocular parallax angle. In consequent, it is possible to prevent astigmatism resulting from beam splitter configuration with a half mirror. Also, it is possible to prevent the loss of information in the center of the acquired image or the resolution reduction of the image due to beam splitter configuration with a triangular prism resulting in light beam reaching the apex of the prism and being scattered instead of reaching the image collecting unit.

Figure 4:
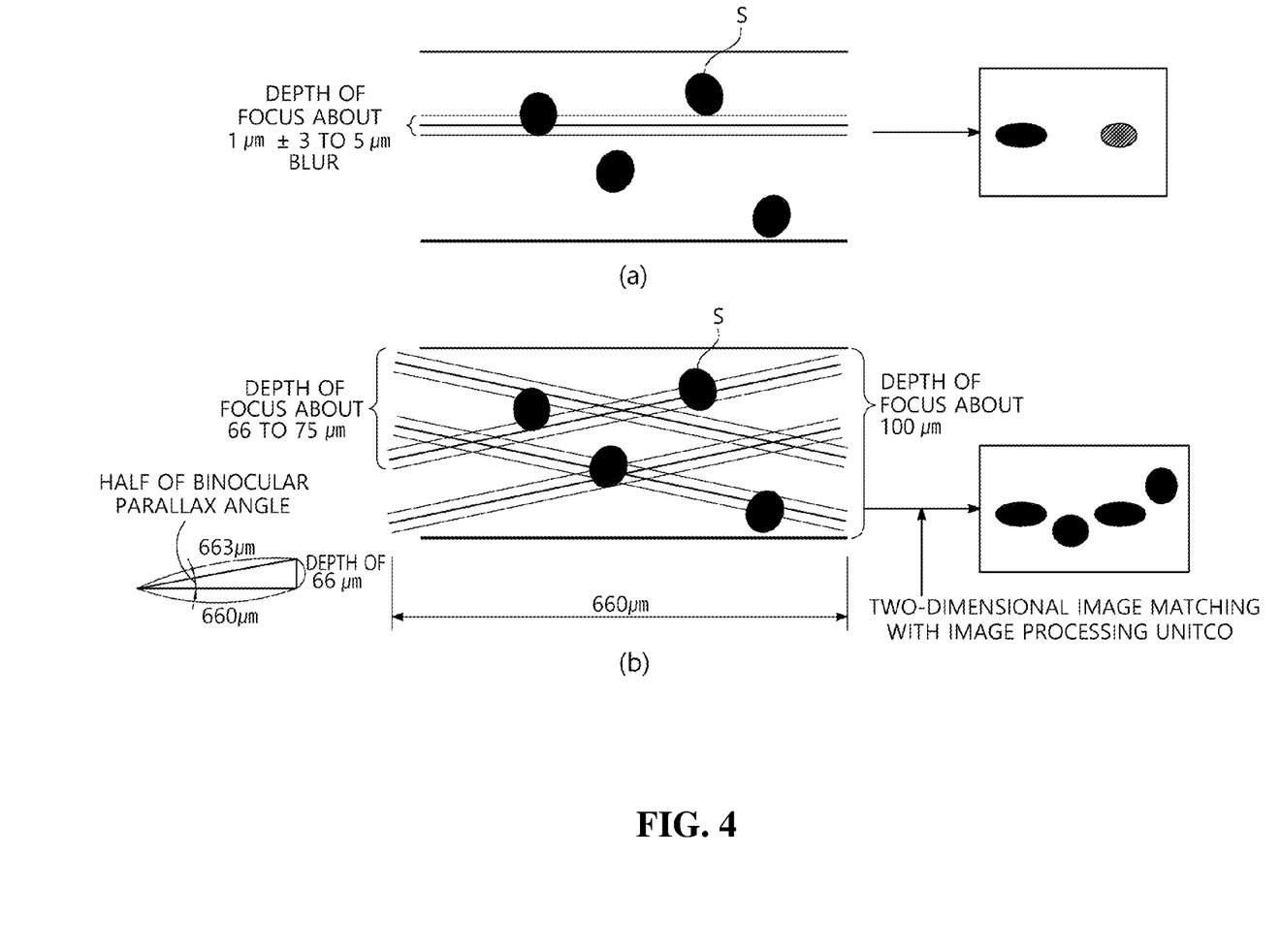
FIG. 4 is a diagram illustrating acquisition of a stereo image by using the image acquisition apparatus of the present invention.

FIG. 4 is a diagram illustrating acquisition of a stereo image by using the image acquisition apparatus 100 of the present invention. In this case, part (a) of FIG. 4 is a diagram schematically illustrating an image of a subject S obtained when a general microscope is used, and part (b) of FIG. 4 is a diagram schematically illustrating an image of a subject S obtained when the image acquisition apparatus 100 of the present invention provided with the polarizing prism unit 10 is used.

Furthermore, the figures exemplified in FIG. 4 are not fixed, but may vary depending on the optical structure of the image acquisition apparatus 100 according to the exemplary embodiment of the present invention.

As described above, the first light beam that has passed through the first polarization unit 12 may be collected into the first image collecting unit 22, and a second light beam that has been refracted through the second polarization unit 14 may be collected into the second image collecting unit 24.

In this case, the first image collecting unit 22 may acquire a first image in which the subject S is imaged by imaging the collected first light beam, and the second image collecting unit 24 may acquire a second image in which the subject S is imaged by imaging the collected second light beam. Preferably, the first image and the second image may be images from different viewpoints of the subject S, depending on the binocular parallax angle of the person.

Referring to FIG. 1, the image acquisition apparatus 100 according to the exemplary embodiment of the present invention further includes an image processing unit 70 and a display unit 80.

The image processing unit 70 may perform a series of computation processes on the first image acquired by the first image collecting unit 22 and the second image acquired by the second image collecting unit 24 to generate two-dimensional image information.

For example, the image processing unit 70 may perform image distortion improvement by classifying components of the first image and the second image in the units of an object and a sub-object, and matching the respective classified components for the first image and the second image, and calculating a size ratio. Next, the image processing unit 70 may calculate the depth per pixel from the calculated result and obtain three-dimensional stereo image data from the calculated depth.

In this case, the image processing unit 70 may convert the acquired three-dimensional stereo image data into a two-dimensional image.

In the image acquisition apparatus 100 according to the exemplary embodiment of the present invention, the data capacity of the acquired image may be reduced by matching the three-dimensional stereo image data into a two-dimensional image through the image processing unit 70 and storing the image.

Furthermore, by making the first polarization unit 12 and the second polarization unit 14 provided in the polarizing prism unit 10 have the first polarization angle and the second polarization angle, respectively, according to the binocular parallax angle, it is possible to accurately implement the binocular parallax of a person when a stereo image is acquired, and thus, as illustrated in part (b) of FIG. 4, it is possible to acquire a high magnification two-dimensional image with a long focal length even for a subject S that is thick or has an inconsistent thickness by improving the depth of focus of the two-dimensional image, compared to the case illustrated in part (a) of FIG. 4.

For example, in part (b) of FIG. 4, when the first image collecting unit 22 and the second image collecting unit 24 are each provided with two image sensors, the depth of focus of the two-dimensional image may be improved to approximately 70 μm. On the other hand, when the first image collecting unit 22 and the second image collecting unit 24 are each equipped with four image sensors, the depth of focus of the two-dimensional image may be improved to approximately 100 μm.

The two-dimensional image of the subject S generated by the image processing unit 70 may be output through the display unit 80. On the other hand, when the display unit 80 is configured with a 3D monitor, the image of the subject S may also be output in the form of a three-dimensional stereo image including the depth map information of the subject S.

Figure 5:
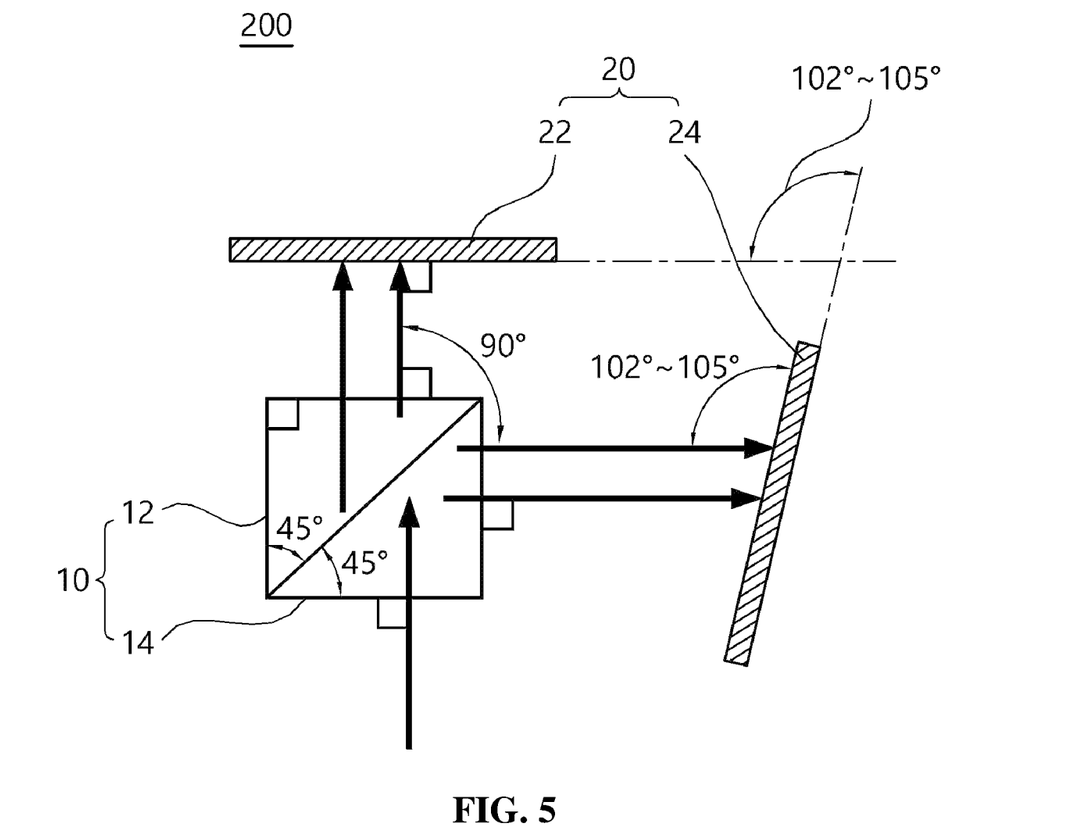
FIG. 5 is a diagram illustrating an optical path of an image acquisition apparatus according to a second exemplary embodiment of the present invention.

FIG. 5 is a diagram illustrating an optical path of an image acquisition apparatus 200 according to a second exemplary embodiment of the present invention. In the case of the image acquisition apparatus 200 according to the second exemplary embodiment of the present invention, there is no significant structural difference compared to the image acquisition apparatus 100 according to the first exemplary embodiment described above, except that the polarizing prism unit 10 is not configured according to the binocular parallax angle of a person. Therefore, in FIG. 5, the same configuration as that of the image acquisition apparatus 100 according to the first exemplary embodiment illustrated in FIGS. 1 to 3 will be indicated by using the same reference number, and the duplicate description will be omitted.

Referring to FIG. 5, the image acquisition apparatus 200 according to the second exemplary embodiment of the present invention includes a polarizing prism unit 10 that splits incident light beams emitted from a lighting unit 60, and a plurality of image collecting units 20 that collect the split light beams from the polarizing prism unit 10.

In this case, the polarizing prism unit 10 provided in the image acquisition apparatus 200 of the second exemplary embodiment may be configured with six sides.

The polarizing prism unit 10 provided in the image acquisition apparatus 200 of the second exemplary embodiment may pass or refract the incident light beams emitted from the lighting unit 60. In detail, the polarizing prism unit 10 includes a first polarization unit 12 having a first polarization angle and a second polarization unit 14 disposed to be in contact with the first polarization unit 12 with a diagonal plane interposed therebetween and having a second polarization angle equal to the first polarization angle.

As illustrated in FIG. 5, the angle (the first polarization angle) that the first polarization unit 12 makes with the vertical direction relative to a line segment on one side of the diagonal plane of the first polarization unit 12 may be 45°.

Further, the angle (the second polarization angle) that the second polarization unit 14 makes with the horizontal direction relative to a line segment on one side of the diagonal plane of the second polarization unit 14 may be 45°.

Like the polarizing prism unit 10 provided in the image acquisition apparatus 100 of the first exemplary embodiment, the first polarization unit 12 provided in the image acquisition apparatus 200 of the second exemplary embodiment may pass a portion of the incident light beam (first light beam), and the second polarization unit 14 may refract a portion of the incident light beam (second light beam).

On the other hand, the image collecting unit 20 provided in the image acquisition apparatus 200 of the second exemplary embodiment includes a first image collecting unit 22 for collecting the first light beam passing through the first polarization unit 12 and a second image collecting unit 24 for collecting the second light beam refracted through the second polarization unit 14.

In this case, the angle formed by the first image collection unit 22 and the second image collection unit 24 may be an angle greater than a right angle.

More specifically, the angle formed by the first image collecting unit 22 and the second image collecting unit 24 may be a right angle (90°) plus a binocular parallax angle of a person (12° to 15°).

Preferably, the angle formed by the first image collecting unit 22 and the second image collecting unit 24 may be approximately 102° to 105°. In this case, in the image acquisition apparatus 200 according to the second exemplary embodiment, the second image collecting unit 24, which is disposed in the vertical direction as illustrated in FIG. 5, may be disposed to be inclined with respect to the vertical direction, and although not illustrated in FIG. 5, the first image collecting unit 22, which is disposed in the horizontal direction, may be disposed to be inclined with respect to the horizontal direction.

Referring to FIG. 5, the angle formed by the first light beam passing through the first polarization unit 12 and the second light beam refracted through the second polarization unit 14 may be approximately a right angle (90°).

In this case, the angle formed by the first image collecting unit 22 and the second image collection unit 24 may be set within a range of 102° to 105° in consideration of the binocular parallax angle of a person.

More specifically, the angle formed by the first image collecting unit 22 and the second image collecting unit 24 may be a right angle plus a binocular parallax angle of a person, and as described above, the angle formed by the first image colleting unit 22 and the second image collecting unit 24 may be approximately 102° to 105°.

Similarly, in the image acquisition apparatus 200 according to the second exemplary embodiment of the present invention, by configuring the angle formed by the first image collecting unit 22 and the second image collecting unit 24 in consideration of the binocular parallax angle of a person, it is possible to accurately implement the binocular parallax of a person when stereo images are acquired, thereby improving the depth of focus of the two-dimensional image.

Figure 6:
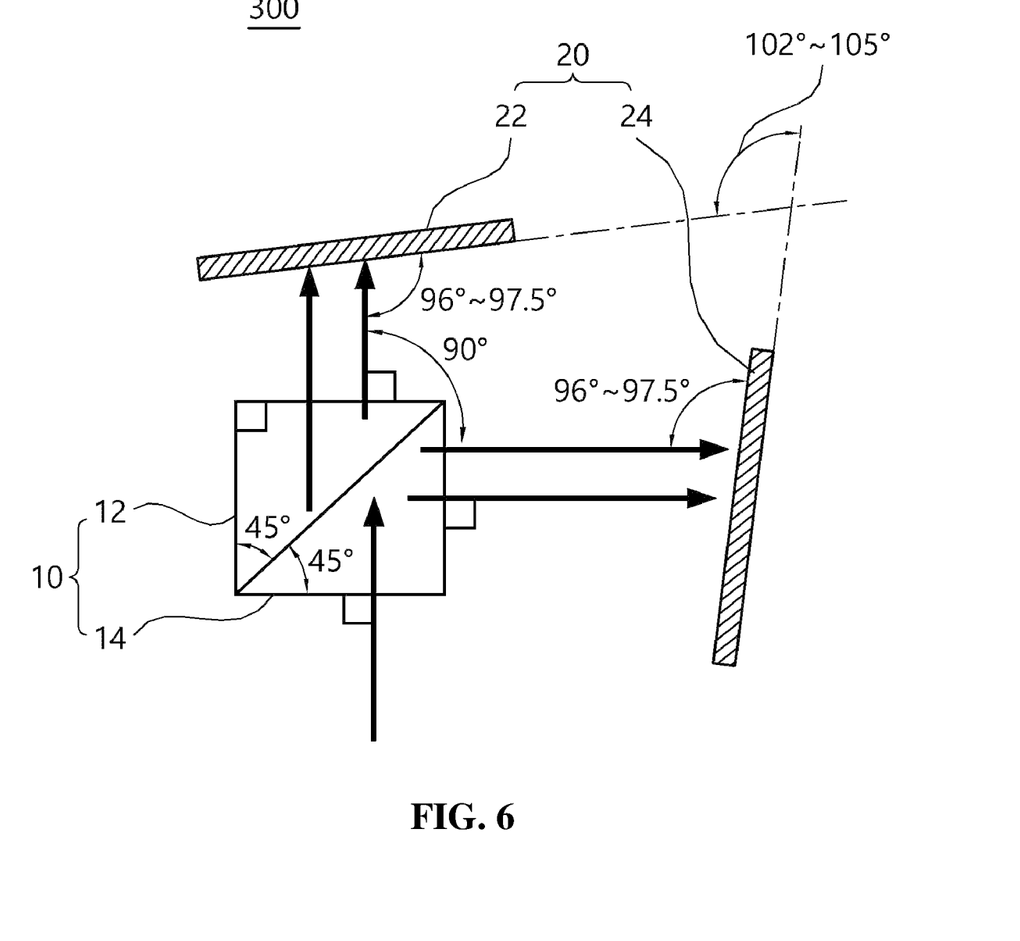
FIG. 6 is a diagram illustrating an optical path of an image acquisition apparatus according to a third exemplary embodiment of the present invention.

FIG. 6 is a diagram illustrating an optical path of an image acquisition apparatus 300 according to a third exemplary embodiment of the present invention. In the case of the image acquisition apparatus 300 according to the third exemplary embodiment of the present invention, there is no significant structural difference compared to the image acquisition apparatus 100 according to the first exemplary embodiment described above, except that the polarizing prism unit 10 is not configured according to the binocular parallax angle of a person.

Therefore, in FIG. 6, the same configuration as that of the image acquisition apparatus 100 according to the first exemplary embodiment illustrated in FIGS. 1 to 3 will be indicated by using the same reference number, and the duplicate description will be omitted.

Referring to FIG. 6, the image acquisition apparatus 300 according to the third exemplary embodiment of the present invention includes a polarizing prism unit 10 that splits incident light beams emitted from a lighting unit 60, and a plurality of image collecting units 20 that collect the split light beams from the polarizing prism unit 10.

In this case, the polarizing prism unit 10 provided in the image acquisition apparatus 300 of the third exemplary embodiment may be configured with six sides.

The polarizing prism unit 10 provided in the image acquisition apparatus 300 of the third exemplary embodiment may pass or refract the incident light beams emitted from the lighting unit 60. In detail, the polarizing prism unit 10 includes a first polarization unit 12 having a first polarization angle and a second polarization unit 14 disposed to be in contact with the first polarization unit 12 with a diagonal plane interposed therebetween and having a second polarization angle equal to the first polarization angle.

As illustrated in FIG. 6, the angle (a first polarization angle) that the first polarization unit 12 makes with the vertical direction relative to a line segment on one side of the diagonal plane of the first polarization unit 12 may be 45°.

Further, the angle (a second polarization angle) that the second polarization unit 14 makes with the horizontal direction relative to a line segment on one side of the diagonal plane of the second polarization unit 14 may be 45°.

Like the polarizing prism unit 10 provided in the image acquisition apparatus 100 of the first exemplary embodiment, the first polarization unit 12 provided in the image acquisition apparatus 300 of the third exemplary embodiment may pass a portion of the incident light beam (the first light beam), and the second polarization unit 14 may refract a portion of the incident light beam (the second light beam).

On the other hand, the image collecting unit 20 provided in the image acquisition apparatus 300 of the third exemplary embodiment includes a first image collecting unit 22 for collecting the first light beam passing through the first polarization unit 12 and a second image collecting unit 24 for collecting the second light beam refracted through the second polarization unit 14.

In this case, the angle formed by the first image collection unit 22 and the second image collection unit 24 may be an angle greater than a right angle.

More specifically, the angle formed by the first image collecting unit 22 and the second image collecting unit 24 may be a right angle (90°) plus a binocular parallax angle of a person (12° to 15°).

Preferably, the angle formed by the first image collecting unit 22 and the second image collecting unit 24 may be approximately 102° to 105°. In this case, in the image acquisition apparatus 300 according to the third exemplary embodiment, the second image collecting unit 24 disposed in the vertical direction may be disposed to be inclined with respect to the vertical direction, and the first image collecting unit 22 disposed in the horizontal direction may be disposed to be inclined with respect to the horizontal direction, as illustrated in FIG. 6.

Referring to FIG. 6, the angle formed by the first light beam passing through the first polarization unit 12 and the second light beam refracted through the second polarization unit 14 may be approximately a right angle (90°).

In this case, the angle formed by the first image collecting unit 22 and the second image collecting unit 24 provided in the image acquisition apparatus 300 of the third exemplary embodiment may also be set within a range of 102° to 105° in consideration of the binocular parallax angle of a person, similar to the image acquisition apparatus 200 of the second exemplary embodiment.

As described above, similar to the image acquisition apparatus 200 according to the second exemplary embodiment of the present invention, in the image acquisition apparatus 300 according to the third exemplary embodiment of the present invention, by configuring the angle formed by the first image collecting unit 22 and the second image collecting unit 24 in consideration of the binocular parallax angle of a person, it is possible to accurately implement the binocular parallax of a person when stereo images are acquired, thereby improving the depth of focus of the two-dimensional image.

Figure 7:
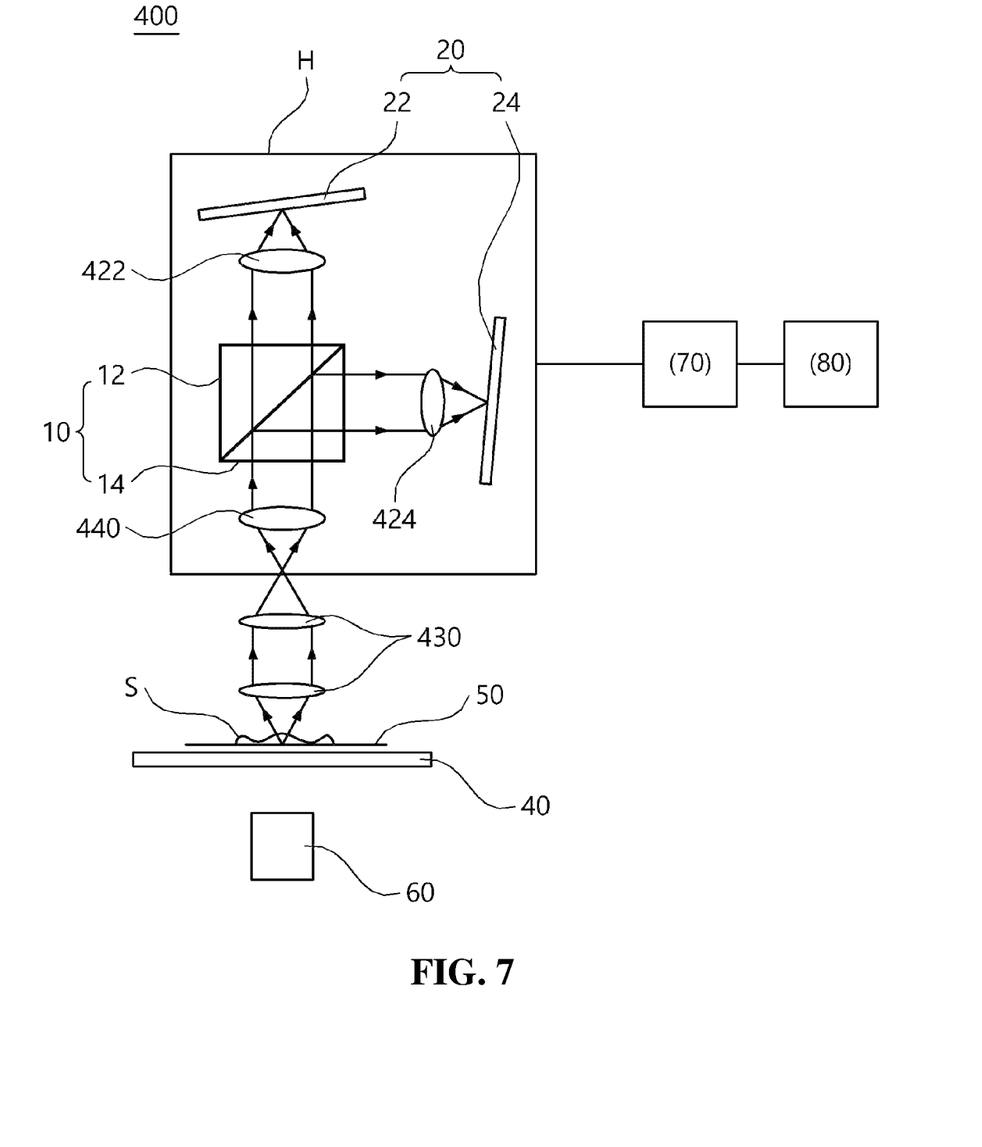
FIG. 7 is a diagram illustrating an optical path of an image acquisition apparatus according to a fourth exemplary embodiment of the present invention.

FIG. 7 is a diagram illustrating an optical path of an image acquisition apparatus 400 according to a fourth exemplary embodiment of the present invention. In the case of the image acquisition apparatus 400 according to the fourth exemplary embodiment of the present invention, there is no significant structural difference compared to the image acquisition apparatus 300 according to the third exemplary embodiment described above, except that a first focusing lens 422 is provided between a first polarization unit 12 and a first image collecting unit 22, a second focusing lens 424 is provided between a second polarization unit 14 and a second image collecting unit 24, a condenser lens unit 430 is disposed under a polarizing prism unit 10, and a third focusing lens 440 is disposed between the polarizing prism unit 10 and the condenser lens unit 430.

Therefore, in FIG. 7, the same configuration as that of the image acquisition apparatus 300 according to the third exemplary embodiment illustrated in FIG. 6 will be indicated by using the same reference number, and the duplicate description will be omitted.

Referring to FIG. 7, an image acquisition apparatus 400 according to a fourth exemplary embodiment of the present invention includes a polarizing prism unit 10 that splits incident light beams emitted from a lighting unit 60, and a plurality of image collecting units 20 that collect the split light beams from the polarizing prism unit 10.

On the other hand, similar to the polarizing prism unit 10 provided in the image acquisition apparatus 300 of the third exemplary embodiment, the polarizing prism unit 10 provided in the image acquisition apparatus 400 of the fourth exemplary embodiment may be configured with six sides.

Further, the image collecting unit 20 provided in the image acquisition apparatus 400 of the fourth exemplary embodiment includes a first image collecting unit 22 for collecting a first light beam passing through the first polarization unit 12 and a second image collecting unit 24 for collecting a second light beam refracted through the second polarization unit 14.

In the image acquisition apparatus 400 of the fourth exemplary embodiment, a first focusing lens 422 disposed between the first polarization unit 12 and the first image collecting unit 22 may adjust the focus of a first image acquired through the first image collecting unit 22. Preferably, the first focusing lens 422 may be, but is not limited to, a biconvex lens.

Similarly, a second focusing lens 424 disposed between the second polarization unit 14 and the second image collecting unit 24 may adjust the focus of a second image acquired through the second image collecting unit 24. Preferably, the second focusing lens 424 may be, but is not limited to, a biconvex lens.

As described above, when the focuses of the first image and the second image are adjusted by the first focusing lens 422 and the second focusing lens 424, respectively, chromatic aberration and top surface curvature of the first image and the second image may be reduced.

On the other hand, the first focusing lens 422 and the second focusing lens 424 described above may also be provided in the image acquisition apparatuses 100, 200, and 300 according to the first to third exemplary embodiments.

Referring to FIG. 7, the image acquisition apparatus 400 of the fourth exemplary embodiment includes a stage 40 disposed under the condenser lens unit 430 and provided with a slide unit 50, and a lighting unit 60 disposed under the stage 40 to emit a light beam onto a subject S disposed on the slide unit 50.

Preferably, the condenser lens unit 430 may include a plurality of lenses as illustrated in FIG. 7, which may be, but is not limited to, biconvex lenses. Furthermore, the condenser lens unit 430 may be formed of an objective lens and a tube lens of a microscope optical system.

In the image acquisition apparatus 400 according to the fourth exemplary embodiment of the present invention, the condenser lens unit 430 may condense the light beams emitted from the lighting unit 60 and transmit the condensed light beams to the polarizing prism unit 10.

On the other hand, it is also possible that the image acquisition apparatus 400 according to the fourth exemplary embodiment of the present invention is not equipped with the above configuration of the condenser lens unit 430, and is instead equipped with the objective lens unit 30 like the image acquisition apparatus 100 of the first exemplary embodiment illustrated in FIG. 1. It is also possible for the image acquisition apparatuses 100, 200, and 300 according to the first to third exemplary embodiments to include the configuration of the condenser lens unit 430 illustrated in FIG. 7 instead of the configuration of the objective lens unit 30.

Referring to FIG. 7, the image acquisition apparatus 400 of the fourth exemplary embodiment may be provided with a third focusing lens 440 disposed between the polarizing prism unit 10 and the condenser lens unit 430. Preferably, the polarizing prism unit 10 and the image collecting unit 20, the first focusing lens 422, the second focusing lens 424, and the third focusing lens 440 provided in the image acquisition apparatus 400 according to the fourth exemplary embodiment of the present invention may be provided in a housing H (body tube) as illustrated in FIG. 7.

In the image acquisition apparatus 400 of the fourth exemplary embodiment, the third focusing lens 440 may change the focal position of light beams that are condensed through the condenser lens unit 430 and transmitted to the polarizing prism unit 10. However, without limitation, collimated light that has passed through the condenser lens unit 430 may also be transmitted directly to the polarizing prism unit 10 without the third focusing lens 440.

Preferably, the third focusing lens 440 is arranged to move up and down on an optical axis connecting the polarizing prism unit 10 and the condenser lens unit 430 so as to adjust the focal position of the light beams that are condensed through the condenser lens unit 430 and transmitted to the polarizing prism unit 10. Accordingly, the third focusing lens 440 may allow a subject S to be enlarged or reduced beyond the focal limit of the condenser lens unit 430 to precisely adjust the field of view according to the magnification.

On the other hand, it is also possible that the aforementioned third focusing lens 440 is provided in the image acquisition apparatuses 100, 200, and 300 according to the first to third exemplary embodiments.

According to the image acquisition apparatus 400 according to the fourth exemplary embodiment of the present invention, similar to the image acquisition apparatuses 100, 200, and 300 according to the first to third exemplary embodiments described above, by configuring the optical structure of the image acquisition apparatus 400 in consideration of the binocular parallax angle of a person, it is possible to acquire a high-magnification image having a longer focal length compared to the related art, and the first focusing lens 422, the second focusing lens 424, and the third focusing lens 440 are further provided, so that it is possible to acquire a stereo image with a more precisely adjusted focus.

Although the exemplary embodiment of the present invention has been described for illustrative purposes, those skilled in the art will appreciate that various modifications, additions and substitutions are possible, without departing from the essential characteristic of the invention. Therefore, the exemplary embodiments disclosed in the present invention and the accompanying drawings are not intended to limit the technical spirit of the present invention, but are intended to illustrate the scope of the technical idea of the present invention, and the scope of the present invention is not limited by the exemplary embodiment and the accompanying drawings. The scope of the present invention shall be construed on the basis of the accompanying claims in such a manner that all of the technical ideas included within the scope equivalent to the claims belong to the scope of the present invention.

The invention claimed is:

1. An image acquisition apparatus, comprising:
a polarizing prism unit for splitting an incident light beam; and
a plurality of image collecting units for collecting the split light beam from the polarizing prism unit,
wherein the polarizing prism unit includes:
a first polarization unit having a first polarization angle obtained by adding half a binocular parallax angle of a person to 45°, and
a second polarization unit disposed to be in contact with the first polarization unit and having a second polarization angle obtained by subtracting half of the binocular parallax angle of a person from 45°.

2. The image acquisition apparatus of claim 1, wherein the image collecting unit includes:
a first image collecting unit for collecting a first light beam passed through the first polarization unit, and
a second image collecting unit for collecting a second light beam refracted through the second polarization unit.

3. The image acquisition apparatus of claim 2, wherein an angle formed by the first image collecting unit and the second image collecting unit is a right angle.

4. An image acquisition apparatus, comprising:
a polarizing prism unit for splitting an incident light beam; and
a plurality of image collecting units for collecting the split light beam from the polarizing prism unit,
wherein an angle formed by each of the image collecting units is an angle obtained by adding a binocular parallax angle of a person to a right angle.

5. The image acquisition apparatus of claim 4, wherein the polarizing prism unit includes:
a first polarization unit having a first polarization angle; and
a second polarization unit disposed to be in contact with the first polarization unit and having a second polarization angle equal to the first polarization angle.

6. The image acquisition apparatus of claim 5, wherein the image collecting unit includes:
a first image collecting unit for collecting a first light beam passed through the first polarization unit, and
a second image collecting unit for collecting a second light beam refracted through the second polarization unit.

7. The image acquisition apparatus of claim 1, further comprising:
an objective lens unit disposed under the polarizing prism unit;
a stage disposed under the objective lens unit and provided with a slide unit; and
a lighting unit disposed under the stage and emitting the light beam onto a subject disposed on the slide unit.

8. The image acquisition apparatus of claim 4, further comprising:
an objective lens unit disposed under the polarizing prism unit;
a stage disposed under the objective lens unit and provided with a slide unit; and
a lighting unit disposed under the stage and emitting the light beam onto a subject disposed on the slide unit.

9. The image acquisition apparatus of claim 2, further comprising:
a first focusing lens disposed between the first polarization unit and the first image collecting unit; and
a second focusing lens disposed between the second polarization unit and the second image collecting unit.

10. The image acquisition apparatus of claim 6, further comprising:
a first focusing lens disposed between the first polarization unit and the first image collecting unit; and
a second focusing lens disposed between the second polarization unit and the second image collecting unit.

11. The image acquisition apparatus of claim 1, further comprising:
a condenser lens unit disposed under the polarizing prism unit;
a stage disposed under the condenser lens unit and provided with a slide unit; and
a lighting unit disposed under the stage and emitting the light beam onto a subject disposed on the slide unit.

12. The image acquisition apparatus of claim 4, further comprising:
a condenser lens unit disposed under the polarizing prism unit;
a stage disposed under the condenser lens unit and provided with a slide unit; and
a lighting unit disposed under the stage and emitting the light beam onto a subject disposed on the slide unit.

13. The image acquisition apparatus of claim 11, further comprising:
a third focusing lens disposed between the polarizing prism unit and the condenser lens unit.

14. The image acquisition apparatus of claim 12, further comprising:
a third focusing lens disposed between the polarizing prism unit and the condenser lens unit.

15. The image acquisition apparatus of claim 2, further comprising:
an image processing unit for generating a two-dimensional image using a first image collected through the first image collecting unit and a second image collected through the second image collecting unit; and
a display unit for outputting the two-dimensional image generated through the image processing unit.

16. The image acquisition apparatus of claim 6, further comprising:
an image processing unit for generating a two-dimensional image using a first image collected through the first image collecting unit and a second image collected through the second image collecting unit; and a display unit for outputting the two-dimensional image generated through the image processing unit.

17. The image acquisition apparatus of claim 1, wherein the polarizing prism unit is composed of a polyhedron.

18. The image acquisition apparatus of claim 4, wherein the polarizing prism unit is composed of a polyhedron.

* * * * *